Feb. 28, 1928.
F. E. SNYDER ET AL
LOW WATER ALARM FOR BOILERS
Filed Dec. 27, 1926
1,661,054
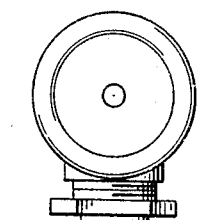
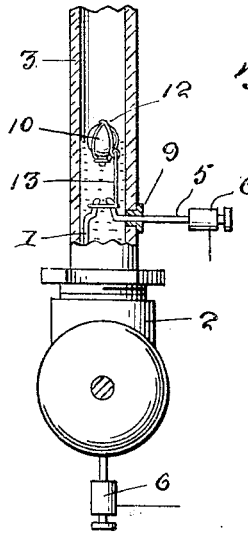
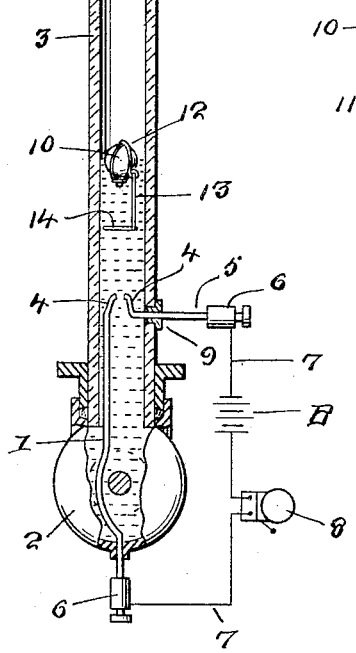
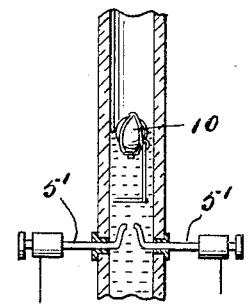
J. P. Von Giesen
F. E. Snyder
INVENTOR
BY Victor J. Evans
ATTORNEY Patented Feb. 28, 1928.

1,661,054

UNITED STATES PATENT OFFICE.

FREDERICK EDWARD SNYDER AND JOHN PETER VON GIESEN, OF BRONX, NEW YORK.

LOW-WATER ALARM FOR BOILERS.

Application filed December 27, 1926. Serial No. 157,365.

This invention relates to a low water alarm for boilers and the like, the principal object of the invention being to provide an alarm circuit having its terminals arranged in the lower part of the water gauge glass, with a float in the said glass which will bridge the terminals when the water in the boiler reaches a low level, thus closing the circuit and sounding an alarm to notify the attendant that the boiler needs refilling.

Another object of the invention is to so form the float that it will remain floating on the top of the water at all times and will not sink due to agitation of the water by steam getting in the gauge glass or when the glass is entirely filled with water.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 1 is a front view of a water gauge, with parts broken away, the invention being shown diagrammatically.

Figure 2 is a fragmentary view showing the float wire as bridging the terminals.

Figure 3 is a fragmentary view illustrating a modification.

Figure 4 is a view of the float and its contact closer.

As shown in Figures 1 and 2, we provide a rod 1 which passes up through the bottom of the lower casing 2 of the gauge to a point slightly above the lower end of the gauge glass 3, with the upper end of the rod bent slightly, as shown at 4. A second rod 5 is passed transversely through the glass with its end bent in the same manner as the part 4 of the rod 1, the ends being separated. The outer end of each rod is provided with a clamp 6 so that the conductors 7 may be fastened thereto, these conductors being connected with the battery B and the alarm 8. The packing means 9 are arranged at the point where each rod enters the device to make a water-tight joint. A float 10, preferably formed of glass and of spherical shape with a depending teat 11, is placed in the glass and said float carries a harness 12 of wire or the like which has a depending part 13, the lower end of which is formed with a loop or eye 14 which, when the water level lowers to a certain point, will rest upon the parts 4 of the rods and thus bridge these parts so that the circuit will be closed and the alarm will be sounded. Thus the attendant will be notified that water must be supplied to the boiler.

By making the float as shown, it will remain at the top of the water at all times, whereas ordinary floats will be driven under the water through agitation of the water by steam and sometimes when the gauge glass is entirely filled with water. We have found that this peculiar form of float prevents accidental closing of the circuit, as it remains on top of the water at all times.

Of course, it will be understood that instead of using a bell for giving the alarm, a lamp may be substituted for giving a visual signal.

In the modification shown in Figure 3, a pair of rods 5' is used, these rods passing through the glass the same as the rod 5 does in Figures 1 and 2, so that the long rod 1 is not used in this construction and both rods are passed through the glass. In other respects, this form of the invention is the same as that before described.

As will be seen, the attachment can be easily and quickly put in place in a water gauge and it will not interfere with the operation of the gauge.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:—

In combination with the gauge of a boiler or the like, a float in the glass of the gauge formed of a spherical body of glass having a depending teat, a harness on the body having a depending portion, a metal eye at the end of the depending portion, a pair of terminals at the lower end of the glass and adapted to be bridged by the eye and a signal circuit connected with the outer ends of the terminals.

In testimony whereof we affix our signatures.

FREDERICK EDWARD SNYDER.
JOHN P. von GIESEN.